(12) United States Patent
Bergmann et al.

(10) Patent No.: US 8,946,309 B2
(45) Date of Patent: Feb. 3, 2015

(54) PROCESS TO GENERATE SYNTHESIS GAS AND/OR LIQUID RAW MATERIALS AND/OR ENERGY MATERIALS FROM WASTE AND/OR BIOMASS

(76) Inventors: Wenzel Bergmann, Bischofswerda (DE); Thomas Müller, Dresden (DE)

( * ) Notice: Subject to any disclaimer, the term of this patent is extended or adjusted under 35 U.S.C. 154(b) by 564 days.

(21) Appl. No.: 13/131,136

(22) PCT Filed: Nov. 20, 2009
(Under 37 CFR 1.47)

(86) PCT No.: PCT/EP2009/065518
§ 371 (c)(1),
(2), (4) Date: Aug. 12, 2011

(87) PCT Pub. No.: WO2010/060862
PCT Pub. Date: Jun. 3, 2010

(65) Prior Publication Data
US 2012/0266532 A1    Oct. 25, 2012

(30) Foreign Application Priority Data

Nov. 25, 2008    (DE) .......................... 10 2008 058 967

(51) Int. Cl.
| | | |
|---|---|---|
| *C08J 11/04* | (2006.01) | |
| *C10G 1/10* | (2006.01) | |
| *C10G 1/00* | (2006.01) | |
| *C08H 8/00* | (2010.01) | |
| *C10J 3/00* | (2006.01) | |

(52) U.S. Cl.
CPC .................. *C10G 1/10* (2013.01); *C10G 1/002* (2013.01); *C08H 8/00* (2013.01); *C10J 3/00* (2013.01); *C10G 2300/1003* (2013.01); *C10G 2300/1011* (2013.01); *C10G 2300/4006* (2013.01); *C10G 2300/4012* (2013.01); *C10G 2300/44* (2013.01); *C10G 2300/807* (2013.01); *C10J 2300/0916* (2013.01); *C10J 2300/0946* (2013.01)
USPC ................ 521/40; 521/40.5; 521/45; 203/40; 203/41; 203/42; 203/43; 210/712; 210/749; 210/750; 210/766; 210/767; 96/108; 208/106

(58) Field of Classification Search
CPC .. C10G 1/002; C10G 1/10; C10G 2300/1003; C10G 2300/1011; C10G 2300/4006; C10G 2300/44; C10G 2300/807; C10G 2300/4012; C08H 8/00; C10J 3/00; C10J 2300/0946; C10J 2300/0916
USPC .............. 521/40, 40.5, 41, 45, 46, 47, 48, 49, 521/49.8; 203/28, 39, 40–43, 46, 47; 203/82–85; 210/712, 749, 750, 766, 767; 96/108; 95/41, 45, 90, 901, 902, 903; 208/106
See application file for complete search history.

(56) References Cited

U.S. PATENT DOCUMENTS

| | | |
|---|---|---|
| 3,708,270 A | 1/1973 | Birk et al. |
| 3,966,582 A | 6/1976 | Cramer |
| 2007/0131585 A1 | 6/2007 | Koch |

FOREIGN PATENT DOCUMENTS

| | | |
|---|---|---|
| WO | WO 2008/054190 | 5/2008 |
| WO | WO 2008/054190 A1 | 5/2008 |
| WO | WO 2008/102307 | 8/2008 |
| WO | WO 2008/102307 A1 | 8/2008 |

OTHER PUBLICATIONS

International Search Report for PCT/EP2009/065518 (in German).
International Preliminary Report on Patentability and Written Opinion of the International Searching Authority, PCT/EP2009/065518, report issued May 31, 2011.

*Primary Examiner* — Frances Tischler
(74) *Attorney, Agent, or Firm* — Wood, Phillips, Katz, Clark & Mortimer

(57) ABSTRACT

Process to generate synthesis gas and/or liquid raw materials and/or energy materials from waste and/or biomass by performing the following steps: a) solvolysis of the organic components of waste and/or biomass in an alkaline solution or hydrate smelter at a temperature range of 150° to 250° C. and pressure between 3 and 12 bar, whereby the organic components are converted into at least one liquid phase and the inorganic components are sedimented; b) elimination of the inorganic components from the liquid phase by physical separation methods; c) transfer of the vapors generated during the solvolysis into a rectification column, where the organic components are separated from water; and d) further separation of the organic components by rectification, extraction and sorption and/or conversion by thermal gasification into synthesis gas or burnable gas.

22 Claims, 2 Drawing Sheets

PROCESS TO GENERATE SYNTHESIS GAS AND/OR LIQUID RAW MATERIALS AND/OR ENERGY MATERIALS FROM WASTE AND/OR BIOMASS

The invention refers to a process for recycling of waste and other materials, whereby the organic components are initially dissolved in an alkaline solution in a solvolysis process and the sedimented inorganic components are subsequently separated. Further the organic components of the activated vapor are separated from water and subsequently separated into individual components by rectification, extraction, sorption or derivatisation and/or they are converted into an inflammable synthesis gas by thermodynamic conversion (gasification).

The term "waste" in the frame of this application applies to the total of all post-consumer or production residues of which the owner has to dispose of and of which the main components or are:

Solid and liquid biomass or products made of it,
Plastics (Polymeres),
Elastomeres,
Inorganic materials such as minerals, metals and their compounds,
Solid or liquid toxic or dangerous materials such as heavy metals and their compounds,
Halogenated organic compounds such as anti-flame agents,
Water (moisture).

According to state of the art possibilities for material recycling are very limited. Technologies are available for separation of components which try to utilize:

hydrodynamic differences (such as wind sifting), or
instrumental analytic methods (such a spectroscopy) or
differences in gravity (float/sediment technologies) or
processes based on differences in solubility of various plastics materials, usually with organic solvents.

All these technologies have in common that the separation results are highly unsatisfactory and/or only allow a material recycling, if any.

In addition technologies are available which use thermodynamic conversion processes such as gasification, pyrolysis, reforming etc. which generate conversion products which then will be used in thermal processes and/or as secondary materials (such as synthesis gas, monomers).

Further technologies are available which use hydrogenation under severe process conditions (Bergius process) which may lead to usable products.

Most of the waste treatment technologies use material recycling by mechanical/physical waste separation.

The recovered recyclable materials such as sheets, PVC, etc., are usually sold and reused as a relatively uniform fraction or as granules. Partly these materials are reused to produce new products, which however in most cases constitute a down-cycling without real market value.

Final residues after separation of recyclables are mostly used as RDF (Refuse Derived Fuel) so that the inherent chemical energy will be converted by incineration into electricity and heat.

However in most cases the energy recovery is not the primary interest but rather the waste disposal.

In any case by applying incineration only the energy content is recovered while the production effort inherent in waste plastics is lost, which however in most cases is far higher than the caloric value.

The German patent DE 197 50 327 C1 describes a technology to produce synthesis gas from renewable cellulose raw and waste materials, which due its consistency is suitable for subsequent incineration in CHP engines, but also for synthesising processes. The process is said to treat also contaminated cellulose materials such as waste wood. Recycling of mixed waste however is not possible.

Starting from this situation it was the basic target of this invention to generate a maximum degree of efficiency in utilising the material components of the waste and/or the energy contents without restrictions from a varying input material mix. It was a special target of the invention to recover high value materials from the waste. Accordingly the main target is on problematic materials such as shredder fluff from car recycling and mixed waste disposal, on other bulk waste, mixed waste, residues from waste sorting, rakings from sewage plants, toxic and contaminated waste and a large variety industrial residues with a high content of undefined contaminants (PVC, anti-flame agents.

This task has been solved with the process as described in patent claim no. 1. The additional claims indicate further improvals.

Figure 1:
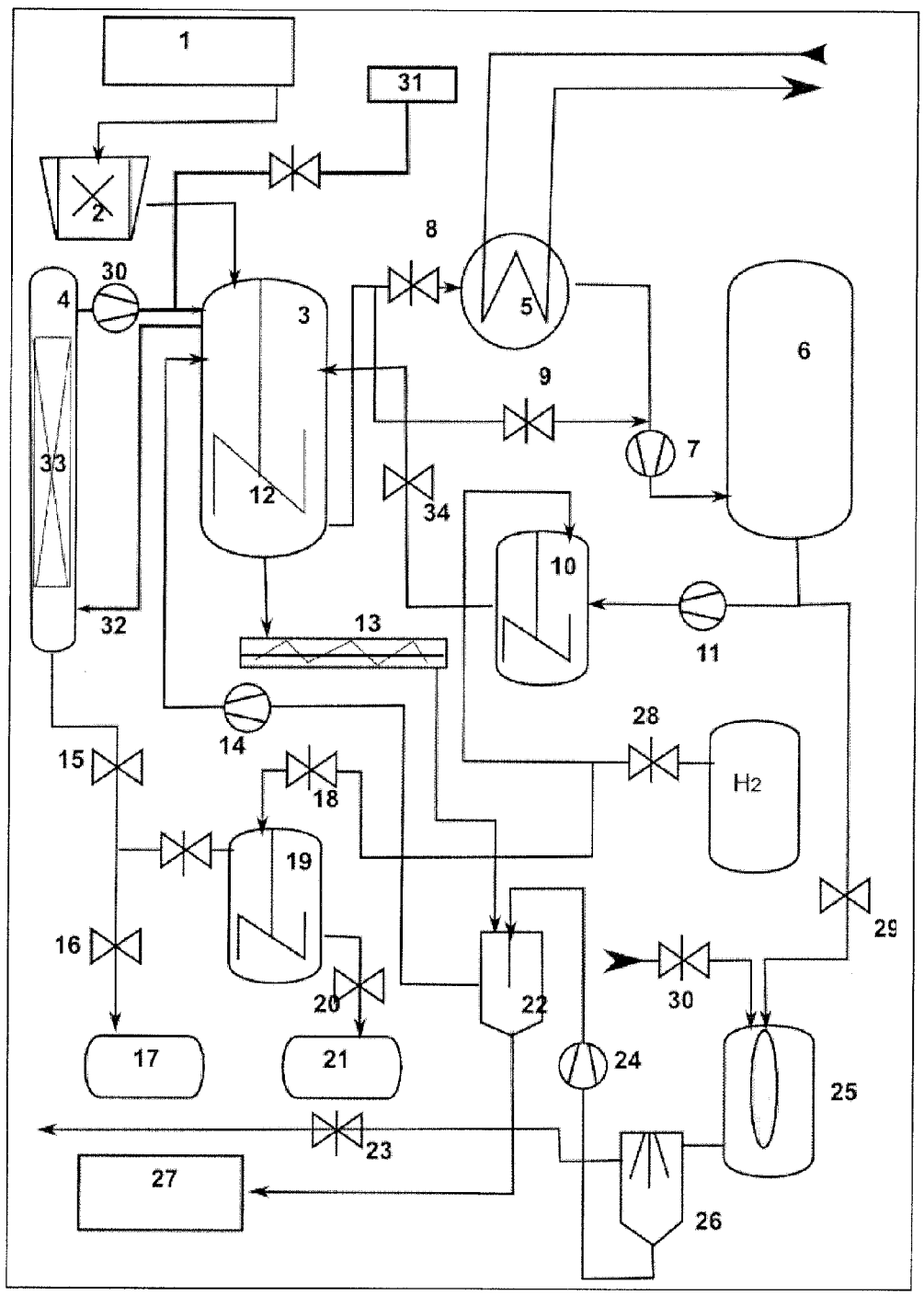
FIG. 1 is a schematic representation of a system for recycling waste, according to the invention.
Figure 2:
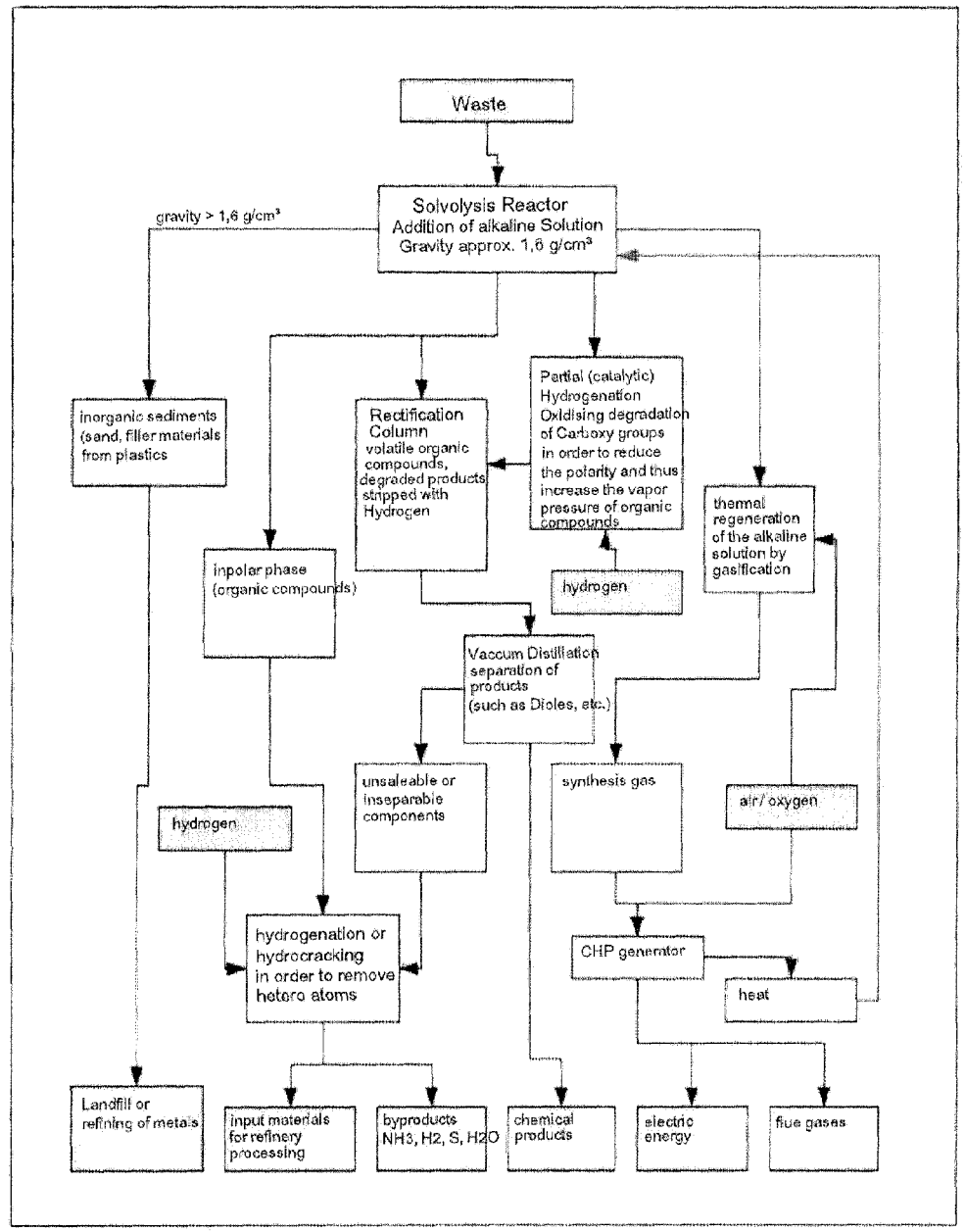
FIG. 2 is a flow diagram representation of a process for recycling waste, according to the invention.

The first process stage is based on the fact that the organic components of the waste are treated by solvolysis, so that they are converted into at least one liquid phase. Below are the chemical reactions described which are undergone by the individual waste components.

Biopolymeres
Cellulose

Cellulose undergoes in the hot watery alkaline solution a molecular deterioration (Peeling-Reaction). This leads to the formation of polyfunctional compounds, especially Hydroxyl- and Carboxyl-Groups.

Lignin

Lignin is basically degraded into various phenolic derivates. Due to the high acidity of the Phenols (Mesomeric stabilisation, inductive effects from Acrylic residues) the equilibrium of the salt formation tends heavily to the salt side. Accordingly these products can be easily dissolved in a polar solvent.

Fatty Acids

Biogene Fatty Acids emulsify into salts of Carbonic Acid and into Propantriol, under the prevailing conditions also the alcoholic components occur in the deprotonised shape. With long retention times the Carbonic Acids are gradually deteriorated by Decarboxylisation.

Proteins

Proteins are degraded into a variety of compounds. Also ugly smelling compounds are formed such as Thioles. Amines and Ammonia.

Plastics free from Heteroatoms/Polymers
Polyolefines

Polyolefines are hardly affected by Solvolysis. They will melt, however especially Polypropylene is highly viscous at temperatures of approx. 200° C. Accordingly it may be useful to add oil as additional solvent in order to render the viscosity pumpable.

Bituminous Materials

Bituminous materials at the prevailing process temperatures will only melt and then float on the surface as a low viscosity phase.

Various Tar Compounds

Tar compounds, which contain mainly aromatic compounds, will be partly converted into soluble compounds, the biggest fraction however, at the prevailing process temperatures will also float on the surface as a low viscosity phase.

Polystyrene

Polystyrenes will normally degrade into monomeres or oligomeres only at temperatures above 250° C. However through influences from other organic compounds and with mechanical agitation there will be still a thermal degradation.

Mass Plastics Containing Heteroatoms

Polyethylene Therephtalate/Polyester

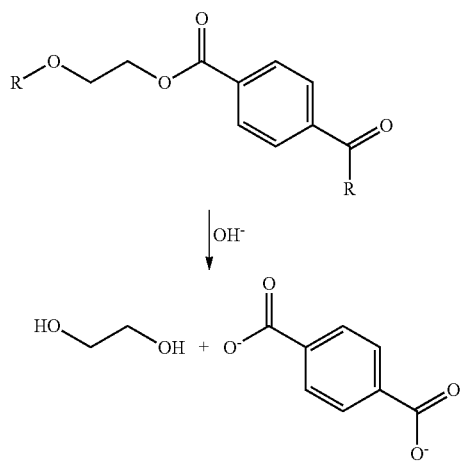

Chemically PET represents an ester of the Terephthalic Acid and Ethandiol. Under the solvolytic conditions this will be hydrolysed into Ethandiol and Terephthalic Acid. According to the thermodynamic equilibrium both products occur as salts. With the prevailing temperatures Terephthalate is easily soluble.

Polyvinylchloride (PVC)

One of the targets of the solvolysis is to substitute the organically bonded chlorine of PVC. Organically bonded chlorine involves high risks under prevailing temperature conditions.

On one side HCl (hydrochloric acid) may be split off (definitely above 200° C.) which may lead to substitution reactions and the formation of new toxic compounds. On the other side under the prevailing temperatures the covalent bonding C—Cl with almost equal negative electric charges may lead to homolytic breaking of the bonding. The resulting formation of free radicals leads to further uncontrolled reactions, which may lead to the formation of highly toxic products. In order to prevent these dangers, the solvolysis reaction assures a chemical reaction as aforementioned. It is safe to assume a reaction as indicated in view of the alkalinity of living group. (Cl is the better living group because they have a lesser alkalinity of the conjugate alkali)

Polyurethane

Polyurethanes cannot be broken up into monomeres by solvolysis like for example PET, they rather break up into relevant alcoholic components and Diamines. From the Diamines Diisocyanates may be produced with assistance of Phosgene.

The following example shows the formation of the alcoholic component 1,4-Butandiol:

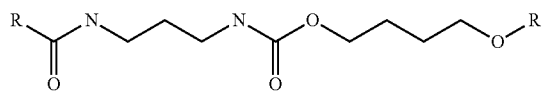

Polyamide

The Hydrolysis of Polyamide also leads to formation of Diamine and Alcohol.

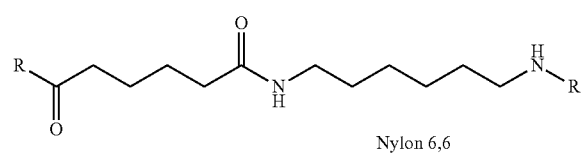

Nylon 6,6

Filler Materials in Plastics

Anorganic Filler Materials

Inorganic filler materials are used to increase the mechanical strength of plastics (for example glass fiber reinforced plastics), or the thermal resistance, but they are also used to merely increase the mass of the plastics.

Typical filler materials are for example

Silica, also ensile, quartz powder,

Silicates, also mixed Silicates from alkali metals and alkaline earth metals, aluminium, iron and zirconium, Oxides, also mixed Oxides from alkaline earth metals, aluminium, silicon and zinc, Hydroxides, also mixed hydroxides from calcium, magnesium and aluminium.

Carbonates, also mixed carbonates from calcium, magnesium and aluminium,

Sulfates, also mixed sulfates from calcium and barium,

Calciumsulfoaluminate,

Aluminium powder and aluminium bronze,

Graphite,

Glass fibres,

Micro glass balls,

Dialuminium-hexamagnesium-carbonate-hexadecahydroxide-tetrahydrate,

Magnesium-sodium-fluoride-silicate,

Heavy metals in form of soaps.

These materials are collected in the sediment, sometimes in a slightly modified form, since they have been dissolved from the plastics matrix. In certain plastics the filler fraction may reach up to 50%.

Other Ingredients in Plastics

Anti-Flame Agent (Flame Retardant)

The most common representatives are polybromated Diphenylic ethers (PentaBDE, OctaBDE, DecaBDE), TBBPA und HBCD. Up to the 70ies of the last century also polybromated Biphenyles (PBB) have been used as anti-flame agent. The chlorinated anti-flame agents include for example chlorinated paraffines and Mirex. Apart from TBBPA these materials are used only as complimentary anti-flame agent Main fields of application are plastics in electric and electronic devices such as television sets and computers, in textiles such as upholstery furniture, mattresses, curtains, sun blinds, carpets, in the automotive industry in plastics parts and upholstery, and in construction as insulating materials and polyurethane foams. Especially in case of fire halogenated anti-flame agent are very dangerous. They do act as flame retardant under heat, since the halogenated radicals which are formed during pyrolysis, handicap the reaction with Oxygen. But they also develop high concentrations of polybromated (PBDD and PBDF) polychlorinated Dibenzodioxines and Dibenzofuranes (PCDD und PCDF). These are commonly known under the term "dioxines" and dreaded for their high toxicity. ("Seveso-Poison").

TBBPA represents a special application of bromated anti-flame agent. It is mainly used as a reactive chemical, which means it is chemically integrated into the polymer matrix, for example in epoxy raisins for circuit boards, and thus forms an integral part of the plastics material.

Other reactive bromated anti-flame agent are for instance bromine- and Dibromstyrene and also Tribromphenol. Since they are integrated into the polymer their emissions are low and usually not toxic. However they do form dioxines in the same amount. However TBBPA is used to a lesser degree as additive anti-flame agent and only few data are available on the degradation products of TBBPA.

All oft the mentioned bromated anti-flame agents are classified according their risk potential within the EU waste regulations 793/93/EWG o rare in the final stages of such classification. As a result PentaBDE and OctaBDE have already been eliminated from the market since they accumulate in the environment, they do not degrade and they are toxic. DecaBDE and TBBPA have been classified as non hazardous for humans and the environment. DecaBDE has been under discussion again lately since new investigations have shown that the material may debromate under UV light and may forms OctaBDE and PentaBDE which have been prohibited recently.

Also anti-flame agents like polybromated Diphenyl ether (PBDE) and polybromated Biphenylene (PBB) (in WEEE, RoHS 2002/95/EG, German electric appliances) have been banned by the EU due the possibility of forming PBDD/F. Only DecaBDE has been explicitly exempted from this ban.

During the solvolysis process a large part of these halogenated organic agents will be converted (as described under the PVC section) so that the risk potential during thermal degradation is largely reduced.

Inorganic Additives

Inorganic Anti-Flame Agents (Flame Retardants)

Organophosphoric Anti-Flame Agents:

This group of compounds typically utilises aromatic und aliphatic esters of phosphoric acid such as:

TCEP (Tris(chlorethyl)phosphate),
TCPP (Tris(chlorpropyl)phosphate),
TDCPP (Tris(dichlorisopropy)phosphate),
TPP (Triphenylphosphate),
TEHP (Tris-(2-ethylhexyl)phosphate),
TKP (Trikresylphosphate),
ITP ("Isopropyl Triphenylphosphate"), Mono-, Bis- and Tris(isopropylphenyl)phosphates with varying degree of isopropylation,
RDP (Resorcinol-bis(diphenylphosphate)),
BDP (Bisphenol-A-bis(diphenylphosphate)).

These anti-flame agents are employed in soft and hard polyurethane foams in upholstery furniture, in automobile seats or in construction materials. Lately however BDP and RDP have substituted OctaBDE in plastics of electric appliances.

Inorganic anti-flame agents are for example:

Aluminiumhydroxide ($Al(OH)_3$), worldwide the most common anti-flame agent (also called ATH for "Aluminiumtrihydrate"). Since it separates water it acts as a cooler and a thinner for gases, however it has to be added in large quantities (up to 60%).

Magnesiumhydroxide ($Mg(OH)_2$, MDH "Magnesiumdihydrate") is a mineralic anti-flame agent with a higher temperature stability as compared to ATH, however with the same type of reaction.

Ammoniumsulfate (($NH_4)_2SO_4$) and -phosphate (($NH_4)_3PO_4$) dilute the gas of the flame by separation of ammonia ($NH_3$), which is incinerated into water and various nitrogen oxides and thus detracts oxygen from the flame. At the same time sulfuric acid ($H_2SO_4$) and phosphoric acid ($H_3PO_4$) are formed which are capable to interrupt reactions oft the radical molecular chains and thus form a protecting layer. In addition these acids are not burning, they are highly hygroscopic and have a high flash point. Thus they condensate within the cooler areas of the flame and deposit on the material. In addition phosphoric acid forms meta- and polyphosphoric acids by separating water, which have an even higher flash point.

Red phosphorous forms a layer of phosphoric and polyphosphoric acids on the surface which causes the surface to expand (intumeszence). This layer prevents the material from oxygen access. These phosphates have the same properties as those from ammonia phosphate.

Antimontrioxide ($Sb_2O_3$) is effective only in combination with halogenated anti-flame agents. It is quite problematic due to its catalytic effect on the formation of dioxines in case of fire.

Antimonpentoxide ($Sb_2O_5$) acts similar to $Sb_2O_3$, also in combination with other agents.

Zinkborate (see under Borates) act as cooler and gas dilutor due to their ability to separate water. Zinc compounds however may also act in synergy and may replace the dangerous antimony trioxide.

Hydrated lime ($Ca(OH)_2$) has been used as anti-flame agent during worldwar II for wooden roof structures. It binds carbon dioxide from the air by separating water and then forms calcium carbonate ($CaCO_3$). Applied as a protecting coating it prevents the access of oxygen.

During solvolysis these inorganic anti-flame agents are eliminated from the plastics matrix in a slightly chemically modified form (for example as calzium phosphate) and then sediment.

Metals

In oxidised metals (possibly with oxidized surface) mainly come from components of technical devices, for example as wires, sheets, profiles, bars, casings, bolts, sheet metal etc.

Metals with higher valency against the solution (non corroding) such as iron, copper, nickel, etc. just sediment within the solvolysis reactor. In any plastics/metal compound materials such as insulation form cables, metals cast into plastics, the surrounding plastics or biopolymers (in case of nails in wood) are removed by dissolving.

Metals with lower valency (corroding) against the solution will be chemically modified.

Aluminium will be converted into an aluminate-compound by separating hydrogen. After a certain aging process also sedimenting compounds such as oxyhydrates are formed.

Also zinc, tin, arsenic, etc. are initially converted into soluble forms which then may be flocculated as sulfides.

Water

Water is usually introduced into the process as moisture. Depending on the type of input material water may well have to be considered in the material balance. There are chemical reactions which consume water (such hydrolysis) or others which liberate water. Usually in case of very dry input material a small amount of water has to be added.

In case of liquid unitary systems the vapor pressure of the liquid depends only on the temperature. This saturated vapor pressure can be derived from the Clausius-Clapeyron-equation. In case of multicomponent systems the situation is more complex. If the different components do not mix with each other the vapor pressure of the different components can be added (Dalton Law). However for ionized components, which in our case are formed from ions of dissolved calcium carbonate and other ionised organic components, other rules apply. In this case components with a lower vapor pressure than water reduce the overall water pressure. However these colligative properties, as they are described in the Raoult Law, are not applicable in our case with high material concentrations.

It became obvious that basically the salt concentration has the major influence on the process performance.

Accordingly the concentration of the solution and the temperature are decisive parameters for the vapor pressure, i.e. the pressure within the system. Of course this is valid only under the condition that gaseous reaction products such as $CO_2$ and $NH_3$ are eliminated from the system.

Preferably the process controls will set the temperature and pressure, so that the corresponding concentration gets adjusted automatically, that means surplus water will leave the system by evaporation. Only in case of water consuming processes such as hydrolysis an addition of water is required. This will become evident by meters and comparison with the pressure/temperature curve.

The reaction temperature has, apart from the equilibrium pressure, basically influence on the following parameters:
- the kinetics of solvolytic processes,
- the secondary degradation reactions,
- the viscosity of the input materials and
- the partial pressure of the organic components in the activated vapor.

Preferably the reaction temperature should be between 150 and 250° C.

The retention times for the reaction will be preferably in a range between 2 and 20 hours (for batch operation) and the equilibrium pressure preferably between 4 and 10 bar.

The solvolysis process may be performed as a batch process, or as a quasi-continuous semi batch process in an agitator vessel or a continuous reactor, or as a combination of both. Both alternatives have their advantages. The choice depends on the expected input materials. If the input materials are of small size and easy flowing, the continuous technology has considerable advantages in respect to the capacity. For smaller plants with remote control a batch operation may be advantageous.

During the solvolysis the reactor content should be agitated. This may happen with a mechanical agitator or by agitating the liquid in a continuous reactor. The choice also depends on the expected input materials.

The discharge of the sedimented residues may be batch wise or continuously. In case there are frequently wires in the residue, a batch operation is advised.

It is advised that the organic components after discharge should be rinsed with recycled alkaline solution or also with fresh water in order to remove remaining alkaline solution. The rinsing liquid can be subsequently used as fresh solvent.

Attached to the reactor is a rectification column. The sump of the column should be separated from the reactor itself. After the column should be installed a pressure controller which maintains a constant pressure within the system equivalent to the equilibrium pressure. This assures that any generated gasses are eliminated from the system.

It is further preferred that organic components are eliminated from the system by extraction, preferably in form of oils. As an option it is possible to increase the yield during extraction or distillation through hydrolysis or electrolysis.

The purpose of the rectification column is to separate and eliminate organic components from the activated vapor via sump, the vapor pressure (as partial pressure) of which is lower than that of water. This causes a constant "irritation" of the thermodynamic system since organic components are constantly fed into the vapor. This assures that the organic components are eliminated from the sump free from alkalis.

The water vapor loaded with organic components is preferably guided from below over the sump into the column, then passes the packing material upward so that the organic components in the vapor are continuously reduced by alternating condensation and evaporation processes. Subsequently the vapor leaves the column on top. The separated organic components on the other hand return into the sump.

With the condensate removed on the top that much heat has to be removed by condensing water as has been released into the water as condensation heat by condensing the organic components.

The organic components are preferably removed from the solvolysis reactor in two ways: via the column or through extraction.

The target is to obtain organic compounds free from alkalis and with low visosity which then can be graded into various fractions according to their specific properties such as vapor pressure, polarity, dielectric properties, gravity, etc.

A separation via a column requires sufficient vapor pressure, while extraction requires a more or less nonpolar behavior of the organic components.

A low vapor pressure results from large molecule sizes and/or from internal molecular reactions. Strong bonding forces prevent an exit of the substances into the vapor phase. These bonding forces (which are not real chemical bondings) are especially strong in case of very polar substances, that means in functional groups which contain hetero atoms. But the bonding forces are not only determined by the presence of hetero atoms but also by specific forms of bonding or by the character of the chemical functionality respectively. Strong binding forces imply a reduction of the vapor pressure, especially if the compounds are converted into their salt from (for instance Carboxylates, Alkoxides, Thiolates etc.), that is to deprotonate.

In case of large molecule dimensions the substance may be extracted if the polarity is sufficiently low, so that only the polarity has to be reduced accordingly. A low polarity is always the precondition for any extraction process.

There are two possibilities to reduce the polarity of a substance: which are described below. The target is always to achieve a quantitative separation of the organics so that no thermal regeneration of the alkaline solution becomes necessary.

A partial hydrogenation allows to convert functional groups into another "degree of oxidation" which then is usually less polar, for instance the conversion from Carboxyl into Hydroxyl. This allows to generate a lower degree of acidity ($K_S$-value), so that a larger portion of the substance appears in a protonated form which then shows a vapor pressure.

This increases the partial pressure of the organic components in the vapor room, so that they become accessible to extraction.

It also possible to perform a full hydrogenation so that the functionality is completely eliminated.

Under the prevailing conditions Raney-nickel is preferably used as catalyst for the hydrogenation. This may be activated "in vitro". This is especially active in an alkaline solution. Resulting water, $H_2S$, $NH_3$ etc. are eliminated via pressure controller and will be treated separately.

Especially the very polar Carboxyl groups which have a strong tendency to form salts, can be eliminated in a very elegant way. Through an electro-chemical one-electron-oxidation a degradation into radical will be initiated, which leads to Decarboxylation and to an addition of the molecular residues (in special cases to Dimerisation). This mechanism is known as Kolbe-Electrolysis or also as Kolbe-Synthesis.

The extraction may be performed continuously by recycling or in batches. In certain cases, if the material mixture contains large quantities of bituminous materials, no additional extraction agents are required, since pumpable viscosities have already been achieved. Also if the input materials are more or less free from polyolefines, no additional extraction agents may be required.

The extraction agents should be selected in such a way that they can be easily separated from the extracted material mixture (for example by vacuum distillation) or that they can be treated jointly together with the extracted materials (for example by hydro cracking) so that again sufficient extraction agent is generated. Also special cheap extraction agents may be used such as used oil.

The substances extracted from the sump of the first column consist of a complex mixture of organic compounds. From this mixture special substances may be separated which have a good market value. This represents also a method of material recycling. This is also interesting in view to the $CO_2$-balance, since the production of these materials from fossil resources such as crude oil require—apart from fresh input materials—also considerable process energy which with this method can be saved.

For the separation of these material mixtures usually a combination of rectification, extraction and sorption gives the maximum yield.

Those materials which cannot be separated and/or which have a low market value, may still be used for energy-recycling or may be sold for further treatment to refineries etc. It is however important that these material mixtures are free from hetero atoms. This can be assured by adding a hydrogenation stage in combination with hydro cracking.

The sediment should be rinsed/washed. If no metals are extracted from the sediment, sulfide ions may be added to the rinsing liquid in order to convert heavy metal salts into insoluble sulfides which then can be disposed on landfills.

However in most cases the extraction of metals is very rewarding, since especially plastics such as PVC import considerable quantities of heavy metals (usually in form of soaps). These usually have a very interesting market value. For the separation of different metals chemical or electro-chemical separation technologies are available.

However it may not be economical in any case to put maximum emphasis on recovery of organic materials. The liquid organic components recovered from the sump phase of the reactor can also be used in thermal processes.

Preferably this is performed by thermal gasification, similar to a modified gasification of black slurry in the paper industry under pressure, so that the condensation of the water of the solution can be utilised. The gas generated by gasification can be used for energy or material applications.

Depending on the individual case emphasis may be on maximum material recovery or thermal treatment or a combination of both.

The figures below shall explain and demonstrate in more detail the invention, without limiting it to the ways of application shown below.

The invention claimed is:

1. A process to generate synthesis gas and/or liquid raw materials and/or energy materials from waste and/or biomass comprising the following steps:
    a) Solvolysis of organic components of waste and/or biomass in an aqueous alkaline solution at a temperature range of 150 to 250° C. and pressure between 3 and 12 bar, whereby the organic components are converted into at least one liquid phase and inorganic components are sedimented,
    b) Elimination of the inorganic components from the liquid phase by physical separation methods,
    c) Transfer of aqueous vapors generated during the solvolysis into a rectification column, where the organic components are separated from water and remain in a rectification column sump, and
    d) Further separation of the organic components from the rectification column sump by further rectification, extraction and sorption and/or conversion by thermal gasification into synthesis gas or burnable gas.

2. The process according to claim 1, wherein the solvolysis is conducted in a pressure vessel with mechanical agitator or in a continuous reactor.

3. The process according to claim 2, wherein the alkaline solution is made available within the reactor or agitator vessel and the waste is fed/added quasi-continuously by piston press or pressurised worm conveyors in a semi-batch process.

4. The process according to claim 2, wherein the waste is charged into the reactor or agitator vessel in a batch operation by opening the reactor and the alkaline solution is subsequently added.

5. The process according to claim 1, wherein heat required for the process during solvolysis is transferred by at least one heat exchanger or by heat transfer media used within the process.

6. The process according to claim 1, wherein the reaction time for the solvolysis is within 2 and 20 hours.

7. The process according to claim 1, wherein for the alkaline solution a watery solution is utilised containing 40 to 70 weight% of Alkali Carbonate or Alkali Hydroxide.

8. The process according to claim 1, wherein organic solvents are added to the alkaline solution.

9. The process according to claim 1, wherein the alkaline solution has a density of 1.3 to 1.7 $g/cm^3$.

10. The process according to claim 1, wherein the inorganic components are eliminated continuously or in batch by at least one discharge facility and are subsequently rinsed with recycled alkaline solution and/or water.

11. The process according to claim 1, wherein inorganic residues metals are recycled by electro refining and/or by galvanic or chemical processes.

12. The process according to claim 1, wherein the rectification column consists of a packing material column.

13. The process according to claim 12, wherein the pressure within the system and after the rectification column will be controlled at constant level by a pressure controller.

14. The process according to claim 1, wherein the organic components within schlep steam is eliminated in a condenser and the cleaned schlep steam is recycled into the process.

15. The process according to claim 1, wherein further separation of the organic components is applied by vacuum distillation.

16. The process according to claim 1, wherein a partial hydrogenation of the organic components is applied after the solvolysis, to decrease the polarity of these organic components and to increase the vapor pressure.

17. The process according to claim 1, wherein after the solvolysis, a hydrogenation and/or a hydro cracking of the organic components now available in liquid form is applied, in order to remove hetero atoms.

18. The process according to claim 5 wherein the heat transfer media is thermo oil or steam.

19. The process according to claim 7, wherein the Alkali Carbonate is Potassium Carbonate.

20. The process according to claim 8, wherein the organic solvents are selected from the group of hydrocarbons consisting of Aliphatic or aromatic hydrocarbons and mixtures thereof.

21. The process according to claim 16, wherein the partial hydrogenation of the organic components is done by using Raney-Nickel as a catalyst.

22. The process according to claim 17, wherein the hydrogenation and/or hydro cracking is done by using Raney-Nickel as a catalyst.

* * * * *